US007426717B1

(12) United States Patent
Schang et al.

(10) Patent No.: US 7,426,717 B1
(45) Date of Patent: Sep. 16, 2008

(54) SYSTEM AND METHOD FOR DEBUGGING FILES IN A RUNTIME ENVIRONMENT

(75) Inventors: Jeff Schang, San Francisco, CA (US); David George, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 523 days.

(21) Appl. No.: 10/293,687

(22) Filed: Nov. 12, 2002

Related U.S. Application Data

(60) Provisional application No. 60/333,911, filed on Nov. 27, 2001.

(51) Int. Cl.
G06F 9/44 (2006.01)
G06F 9/45 (2006.01)

(52) U.S. Cl. .................. 717/124; 717/133; 717/135

(58) Field of Classification Search ......... 717/114–118, 717/124–135, 140–141, 145–148, 150, 162, 717/168–178; 714/34–35, 38, 46, 48
See application file for complete search history.

(56) References Cited

U.S. PATENT DOCUMENTS

| 5,764,989 | A  | * | 6/1998  | Gustafsson et al. ......... 717/129 |
| 5,778,230 | A  | * | 7/1998  | Wimble et al. .............. 717/131 |
| 6,253,368 | B1 | * | 6/2001  | Nelin et al. ................. 717/124 |
| 6,553,565 | B2 | * | 4/2003  | Click et al. .................. 717/129 |
| 6,671,825 | B1 | * | 12/2003 | Joshi et al. ..................... 714/38 |
| 6,938,245 | B1 | * | 8/2005  | Spertus et al. .............. 717/127 |
| 6,966,051 | B2 | * | 11/2005 | McBrearty et al. .......... 717/124 |
| 6,978,444 | B1 | * | 12/2005 | Farchi et al. ................ 717/129 |
| 6,981,243 | B1 | * | 12/2005 | Browning et al. ........... 717/124 |
| 6,983,450 | B2 | * | 1/2006  | Russo et al. ................. 717/124 |
| 2002/0038168 | A1 | * | 3/2002  | Kasuga et al. ............... 700/245 |
| 2002/0120918 | A1 | * | 8/2002  | Aizenbud-Reshef et al. 717/127 |
| 2002/0120919 | A1 | * | 8/2002  | Aizenbud-Reshef et al. 717/127 |
| 2002/0144245 | A1 | * | 10/2002 | Lueh .......................... 717/140 |
| 2002/0174415 | A1 | * | 11/2002 | Hines ......................... 717/127 |
| 2003/0023347 | A1 | * | 1/2003  | Konno et al. ................ 700/245 |
| 2003/0028858 | A1 | * | 2/2003  | Hines ......................... 717/125 |

OTHER PUBLICATIONS

A Petri net-based distributed debugger, Liu, A.-C.; Engberts, A., IEEE, 1990, pp. 639-646.*
The design of DARTS: a dynamic debugger for multiprocessor real-time applications, Gielen, F.J.A.; Timmerman, M., IEEE, 1991, pp. 153-161.*
T++: a test case generator using a debugging information based technique for source code manipulation, Gil, J.; Holstein, B., IEEE, 1997, pp. 272-281.*

* cited by examiner

*Primary Examiner*—Wei Y. Zhen
*Assistant Examiner*—Satish S Rampuria
(74) *Attorney, Agent, or Firm*—Fish & Richardson P.C.

(57) ABSTRACT

A system and method allows the debugging of a program by an application without requiring knowledge of the operation of the interpreter or compiler.

48 Claims, 8 Drawing Sheets

```
PROGRAM FILE 400A
┌─────────────────────────┐
│ USER CODE 430           │
└─────────────────────────┘
┌─────────────────────────┐
│ USER CODE 431           │
└─────────────────────────┘
            ⋮
```

FIG. 4A (PRIOR ART)

```
PROGRAM FILE 400B
┌─────────────────────────┐
│ UTILITY FUNCTIONS 408   │
└─────────────────────────┘
┌─────────────────────────┐
│ INSTRUMENTATION 410     │
└─────────────────────────┘
┌─────────────────────────┐
│ USER CODE 430           │
└─────────────────────────┘
┌─────────────────────────┐
│ INSTRUMENTATION 412     │
└─────────────────────────┘
┌─────────────────────────┐
│ USER CODE 432           │
└─────────────────────────┘
┌─────────────────────────┐
│ INSTRUMENTATION 414     │
└─────────────────────────┘
┌─────────────────────────┐
│ USER CODE 434           │
└─────────────────────────┘
            ⋮
```

FIG. 4B

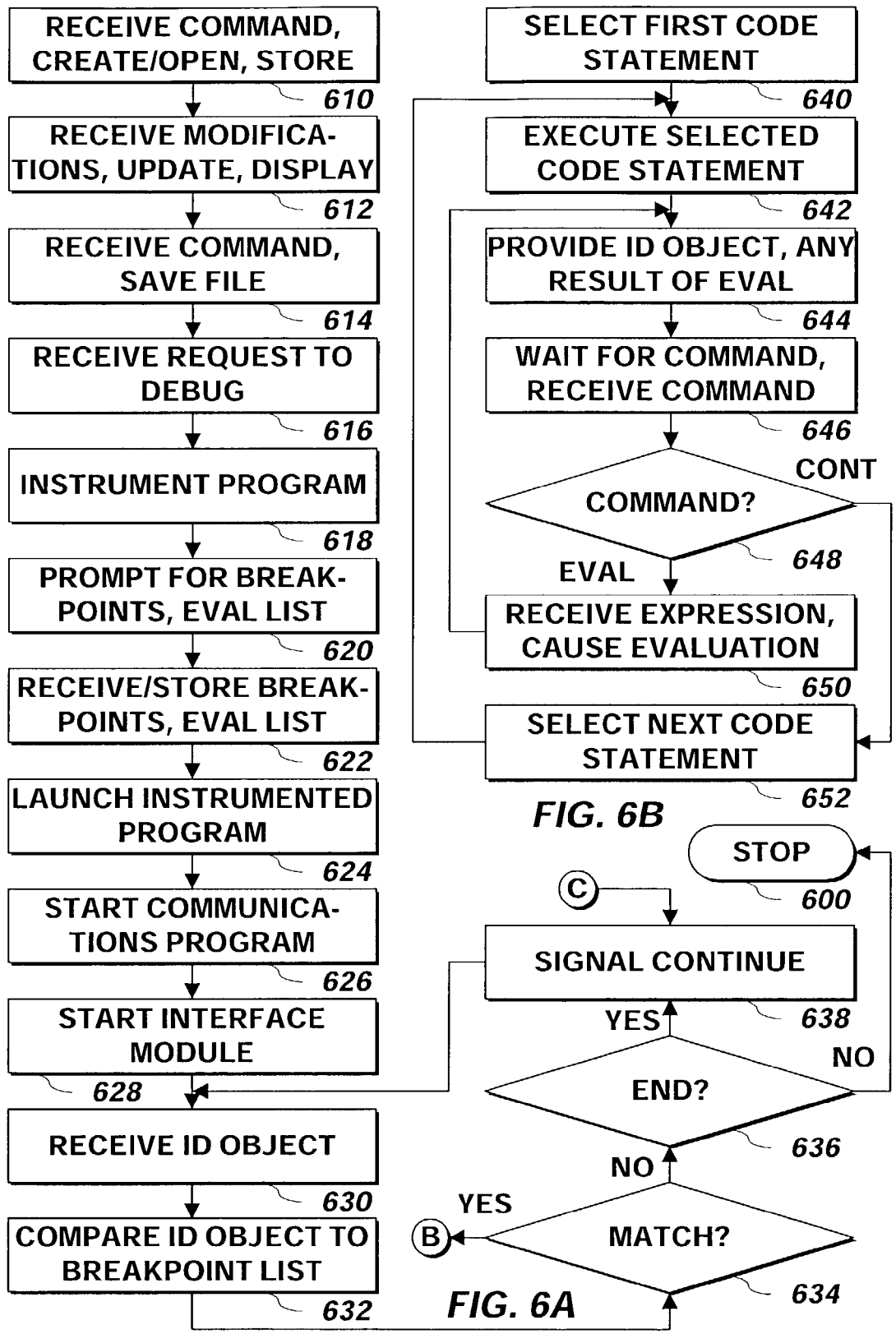

SYSTEM AND METHOD FOR DEBUGGING FILES IN A RUNTIME ENVIRONMENT

RELATED APPLICATION

This application claims the benefit of, U.S. Provisional Patent Application Ser. No. 60/333,911 entitled, METHOD AND APPARATUS FOR DEBUGGING FILES" filed by Jeff Schang and David George on Nov. 27, 2001 and that application is hereby incorporated by reference herein in its entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is related to computer software and more specifically to computer software for program development.

BACKGROUND OF THE INVENTION

Computer software can be developed using an authoring tool. The authoring tool provides an environment including a text editor that allows the author to draft and edit the source code for the computer software. Some conventional authoring tools for developing computer software are provided with debugging tools that allow an author of the computer software to execute and debug the computer software from the development environment, allowing the author to rapidly switch between authoring of the computer software and debugging of the computer software.

Conventional debugging tools for compiled computer software allow the author to execute the computer software being debugged in a manner that is identical to the execution of the software in a runtime environment. Because the authoring tool compiles the computer software, and because the debugger is supplied by the same company that supplies the compiler, it is possible for the debugger to accurately simulate the operation of the computer software in the runtime environment and execute the computer software in exactly the same way. If the computer software is interpreted, the accurate simulation is also possible if the supplier of the debugger is the same party that supplies the interpreter.

If, however, the debugger is not supplied by the same party as the party supplying the interpreter or compiler, the accurate simulation or reproduction of execution or interpretation of the computer software may not be possible by the debugger if the supplier of the interpreter or compiler refuses to disclose their specifications or if such specifications are not available, or incomplete or would be inaccurate. If multiple third-party interpreters or compilers are available to interpret or compile the same source code, the accurate simulation of execution or interpretation by all of the available compilers or interpreters can be more difficult to achieve if each such interpreter or compiler operates differently or has the potential to operate differently.

In such a circumstance, the author wouldn't fully trust the debugging tool to accurately simulate the execution or interpretation, requiring the author to first debug the computer software using the debugging tool, then test the computer software in a runtime environment. If the debugger had not accurately simulated the execution of the computer software, the author is left stranded without a way to debug the computer software in a manner that precisely simulates its execution. The problem is compounded when multiple sources supply compilers or interpreters, each as part of an ever changing product, making it difficult or impossible for the supplier of the debugging tool to incorporate each and every change made by each compiler or interpreter.

The worst case scenario is currently applicable to JAVASCRIPT computer software written for interpretation by any of a number of browsers. Many authoring tools used to author JAVASCRIPT code to be executed when a web page is displayed are provided by suppliers who are different from the suppliers of the browsers. Each browser may have its own varying interpretation techniques, and the interpretation techniques are not completely published by the browser manufacturers. These factors make it difficult or impossible for the suppliers of the various authoring tools to provide debugging tools that can accurately reproduce how each browser will interpret the JAVASCRIPT computer programs supplied with web pages to those browsers. This makes it hard for an author to trust the debugging tool and provides the potential for an author to be stuck without the means to effectively debug a JAVASCRIPT program.

In addition to all of these problems with accurate simulation of the runtime environment, some debugging techniques are not very stable. For example, attempting to discern the value of an expression that cannot be evaluated can cause an error that can crash the computer system on which the computer program is being debugged, making the debugging process more time consuming and cumbersome.

What is needed is a system and method that can provide a debugging tool that accurately reproduces the operation of a compiler or interpreter without requiring the supplier of the debugging tool to have access to accurate specifications of the compiler or debugger and can provide such accurate debugging for a variety of compilers or interpreters but without crashing the computer system on which the debugging tool is operating if an author makes a request via the debugging tool that would otherwise crash the executing program.

SUMMARY OF INVENTION

A system and method allows computer software to be debugged while running in its actual runtime environment. The system and method alters the source code for the computer program by supplying additional code, and supplies a communication program to allow communication between the running program and a debugging tool and control of the running program by the debugging tool, then sends the altered computer program to the interpreter for execution or the compiler for compilation and execution. The author can then use the debugging tool to request the implementation of conventional debugging functions such as setting breakpoints or viewing values of computer program variables or other expressions, and the debugging tool communicates with the running program to carry out the author's requests and provides results of such requests and other status information. Because the computer program being debugged in this fashion is debugged in a runtime environment, simulation is unnecessary, eliminating the need for accurate specifications from third parties. The communication between the debugging tool and interpreters can allow the trapping of errors that would otherwise crash not only the computer program being debugged but also the system and method, such trapping thereby providing a more stable environment in which to debug the computer program.

BRIEF DESCRIPTION OF THE DRAWINGS

FIG. 4A is a block schematic diagram of a conventional uninstrumented computer program.

FIG. 4B is a schematic diagram of an instrumented computer program according to one embodiment of the present invention.

FIGS. 6A and 6C are a method of debugging a file according to one embodiment of the present invention.

FIG. 6B is a method of executing a program instrumented for debugging according to one embodiment of the present invention.

DETAILED DESCRIPTION OF A PREFERRED EMBODIMENT

Figure 1:
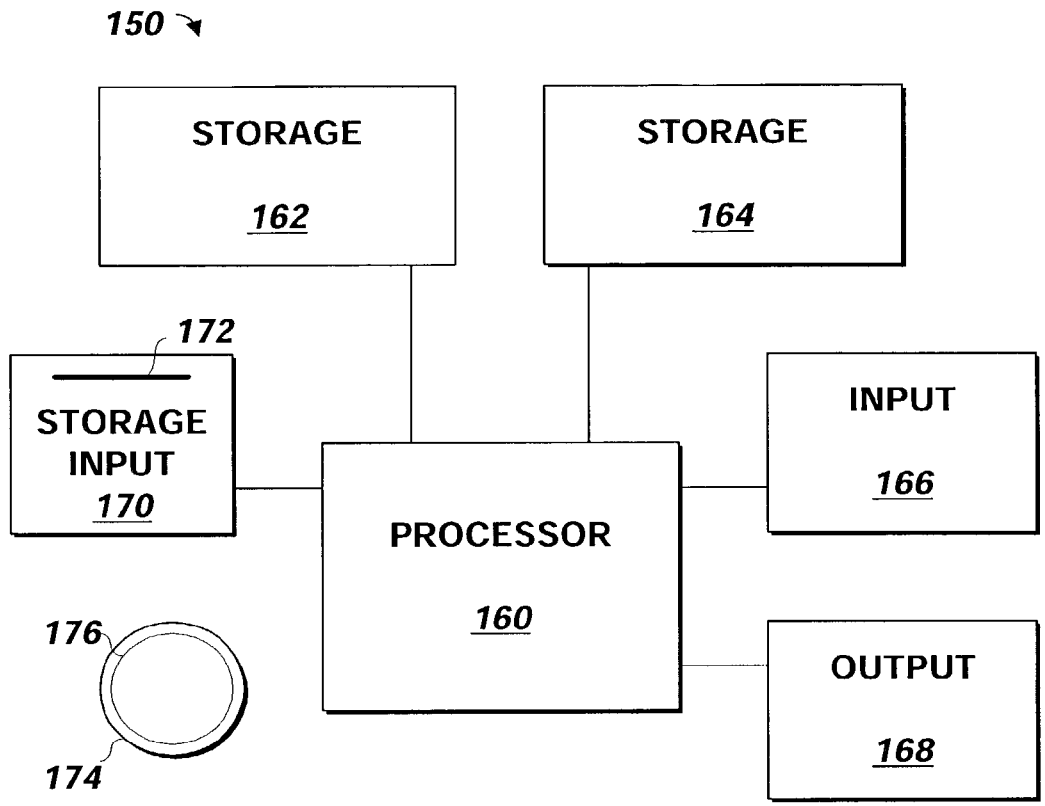
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the Solaris operating system commercially available from SUN MICROSYSTEMS of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a MACINTOSH computer system running the MACOS or OPENSTEP operating system commercially available from Apple Computer Corporation of Cupertino, Calif. and the NETSCAPE browser commercially available from NETSCAPE COMMUNICATIONS CORPORATION of Mountain View, Calif. although other systems may be used.

Overview of System

Figure 2:
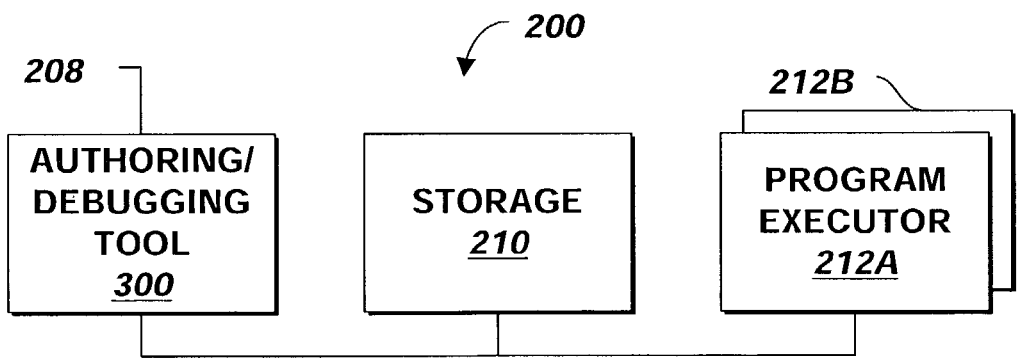
FIG. 2 is a block schematic diagram of a system for debugging files according to one embodiment of the present invention.

Referring now to FIG. 2, a system 200 for debugging computer programs is shown according to one embodiment of the present invention. Authoring/debugging tool 300 contains elements for debugging a computer program such as those described in more detail below. In one embodiment, authoring/debugging tool 300 also contains an authoring environment for the computer program. If the computer program is part of a web page, authoring/debugging tool 300 may include an authoring program for the web page itself, and therefore contains a conventional web authoring tool, such as some or all of the conventional DREAMWEAVER 4 product commercially available from MACROMEDIA, INC. of San Francisco, Calif., or the conventional GOLIVE product commercially available from ADOBE, INC., of San Jose, Calif. DREAMWEAVER is described in Towers, *Dreamweaver for Windows and Macintosh* (Peachpit Press 2000, ISBN 0-201-70240-1), and GOLIVE is described in Carlson & Fleishman, *Real World Adobe GoLive* 4 (Peachpit Press 2000, ISBN 0-201-35522-8) and both of these books are hereby incorporated by reference in their entirety.

Program executors 212A-212B include any application program that can interpret, or can compile and execute, the source code of a computer program, and may include a conventional browser capable of interpreting JAVASCRIPT code or other forms of source code, such as the browsers described above. In one embodiment, program executor 212A is or contains some or all of a browser supplied by one supplier and program executor 212B is or contains some or all of a browser supplied by a different supplier. In another embodiment, each program executor 212A or 212B includes a conventional compiler and may include a runtime environment such as a conventional operating system. Although only two program executors 212A, 212B are shown in the Figure, any number of program executors may be used by the present invention.

Storage 210 is conventional disk storage, memory or both. Authoring/debugging tool 300 reads and provides files containing computer programs to storage 210 and each program executor 212A, 212B can read such files and interpret or otherwise execute code contained in such files. In one embodiment, all user communication into or out of system 200 is made via input/output 208 of authoring/debugging tool 300 which is coupled to a keyboard, mouse, display screen, printer, disk drive, CD-ROM drive, and/or other conventional user input and output devices.

The system below is described with program executors 212A, 212B including the operation of conventional browsers and the computer program source code including a JAVASCRIPT application program that is at least in part included on a web page for display by a browser, however, the present invention is not limited to this representative embodiment.

Overview

A user of system 200 may include an author of a computer program, such as the author of a web page containing a computer program such as JAVASCRIPT. In one embodiment, the user uses system 200 to write and debug computer programs embedded in web pages, which contain source code for graphical information. The user uses a authoring/debugging tool 300 to create web pages, and includes programs in the web pages to manipulate the graphic environment or perform other functions. System 200 allows the user to interactively control the program execution and examine the program state at any point in the program's execution. The user may cause the program to execute in any one of a number of environments, and debug the program in any or all of the environments the program is expected to run in, such as on different makes and versions of program executors 212A, 212B such as browsers.

Begin Editing

Figure 3:
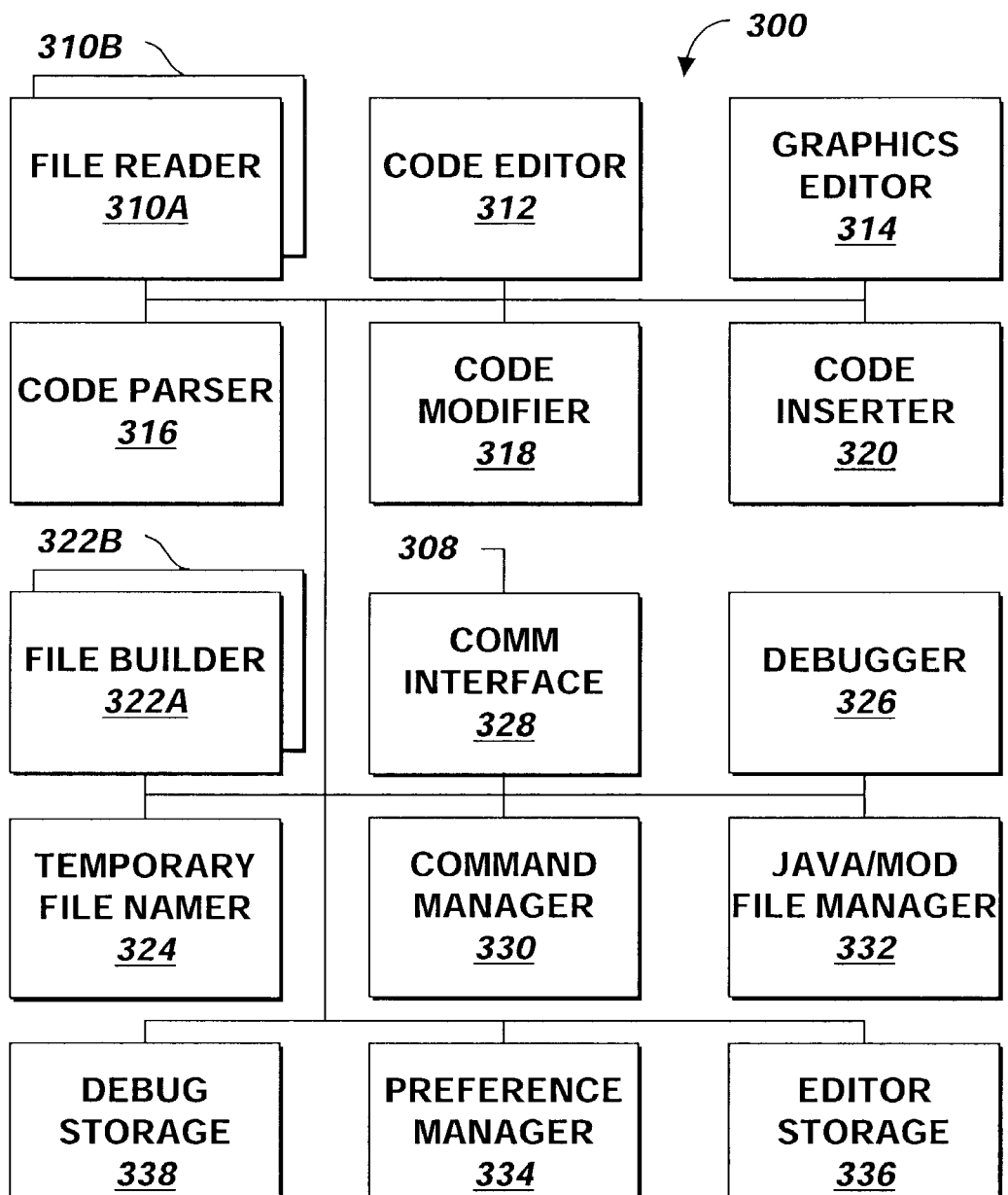
FIG. 3 is a block schematic diagram of authoring/debugging tool 300 of FIG. 2 according to one embodiment of the present invention.

Referring now to FIG. 3, a block schematic diagram of the authoring/debugging tool 300 of FIG. 2 is shown in more detail according to one embodiment of the present invention. In one embodiment, authoring/debugging tool 300 is used by an author to create or edit one or more documents. As used herein, a document may contain a portion or all of a computer program, and may optionally contain the source code for a web page including HTML tags, server-side code or other conventional portions of the source code of a web page.

To create, edit or save a document, the author provides commands to authoring/debugging tool 300. Authoring/debugging tool 300 receives each command via input/output 300 and communication interface 328. Referring momentarily also to FIG. 2, in one embodiment, all communication into or out of authoring/debugging tool 300 is done via input/output 308 of communications interface 328, which is coupled to input/output 208 of system 200. Communications interface 328 sends the command to the appropriate portion of the remainder of authoring/debugging tool 300.

One such command is a command to open a file. Command manager 330 receives the command and requests a file identifier, such as name and path of the file to be opened via a user interface it provides, and sends the file identifier to either file reader 310A or file reader 310B, depending on the type of document the author requests to be opened, such as may be indicated by the extension of the file. File reader 310A reads documents in HTML format such as would be capable of being rendered by a browser or in a conventional format supplied to a web server capable of processing server side code. File reader 310B reads documents in a proprietary format or any format that would not be capable of being rendered by a browser or in a conventional format supplied to a web server capable of processing server side code. Once file reader 310A or file reader 310B have read the document, file reader 310A or file reader 310B store the document in editor storage 336. In contrast to opening an existing file, if a user wishes to create a new file, the user provides to command manager 330 a command to start a new file and command manager 330 initializes a new file in editor storage 336. The details of how files are read and documents are stored of created in editor storage 336 are described in copending U.S. application Ser. No. 09/991,759 entitled, "SYSTEM AND METHOD FOR EDITING INFORMATION" filed Nov. 23, 2001 by Narciso Jaramillo, and that application is incorporated herein by reference in its entirety.

Once a file is read or a new file is started, command manager 330 signals code editor 312 and graphics editor 314, which each launch in their own separate window or pane on the display. In one embodiment, the user can independently display or hide code editor 312 or graphics editor 314.

In such embodiment, graphics editor 314 formats and displays the document in a graphics window it manages, while code editor 312 displays the source code of the document unformatted in a code window it manages, each as described in the copending application. For example, when the user is working on an HTML document, graphics editor 314 displays the document in the graphics window as would a conventional browser would render the document, and code editor 312 displays the HTML source code for the document in the code window. The user may create or edit the document either by working graphically in the graphics window, or by editing the HTML source code in the code window.

As the user works on the document, code editor 312 or graphics editor 314 or both receive commands from the user via input/output 308 and communication interface 328 as described above, and both use the user's commands to alter objects stored in editor storage 336 as described in the copending application and signal the other code editor 312 or graphics editor 314 to read the objects in editor storage 336 and update the window or pane that 312 or 314 controls.

In one embodiment, the user uses code editor 312 or graphics editor 314 to add source code of a computer program to editor storage 336, for example as one or more text objects. In one embodiment, the source code contains conventional JAVASCRIPT code, any conventional source code for any other interpreted language, source code for a compiled language or any other source code for a computer program.

Once the user has completed editing the document using graphics editor 314 or code editor 312, the user may wish to save the objects in editor storage 336 as a file in non-volatile storage, such as a disk drive. To do this, the user provides a "file save" command to command manager 330 and command manager prompts the user for a file identifier such as a filename and path and optionally a type of the file via a user interface command manager 330 generates. The command and file identifier are received by command manager 330 an described above and command manager 330 signals file builder 322A or file builder 322B with the file identifier based on the type of file the user requests.

File builder 322A or file builder 322B receives the file identifier, and builds using the objects in editor storage 336 a file in non-volatile storage such as storage 210 of FIG. 2 via input/output 308. File builder 322A builds and writes the document in a conventional, non-proprietary format such as a flat file containing ASCII characters including HTML tags. File builder 322B builds and writes the document in a proprietary format. The details of building and writing files are described in the copending application described above.

The document stored then contains at least a portion of a program. Referring momentarily also to FIG. 4A, a conventional program 400A is shown according to one embodiment of the present invention. Program 400A contains user code 430 and 431, each containing a single statement, such as an if-then-else statement, an assignment statement or any other type of statement. Although only two statements 430, 431 are shown, any number of statements may be used and multiple statements may reside on the same line in program 400A.

Begin Debugging

Once the user has completed writing the program or any portion thereof, the user may initiate debugging of the program. To initiate debugging, the user first saves the program to disk as described above. The user can then debug the program by providing a command to command manager 330 to initiate the debugging process. Command manager 330 receives the command as described above and sends the file identifier, including name and path, of the saved program file to code parser 316.

Code parser 316 receives the file identifier, examines the objects in editor storage 336, locates the objects corresponding to the source code for the computer program, determines the boundaries of each program statement 430, 431, and signals code modifier 318 or code inserter 320 or both to instrument the program as will now be described.

One way that code parser 316 can parse the program is to construct a data structure such as a syntax tree that identifies each program statement. Code parser 316 is a conventional code parser that uses conventional techniques to build such data structures. These techniques are described in "Modern Compiler Design" by Grune, Bal, Jacobs, and Langendoen, John Wiley and Sons, New York, 2000, which is hereby incorporated by reference herein in its entirety.

As code parser 316 parses the program, code parser 316 may detect one or more syntax errors in the program using conventional techniques. If code parser 316 detects any syntax errors, code parser 316 sends an appropriate error message to the user via communications interface 328 and input/output 308, signals command manager 330, and stops the debugging process to allow the author to correct the syntax errors and reinitiate the debugging process, at which time code parser 316 will reparse the source code.

During the parsing process, code parser 316 may encounter a reference to an external file, that is, a file that is external to the program being parsed. If code parser 316 encounters such a reference, code parser 316 extracts the file name and path of the external file from the referring statement, and examines the referring statement and the file name and path.

One type of external file that code parser 316 may encounter is an external program file. An external program file is a file that contains some or all of the source code for the computer program being debugged. In the case, code parser 316 sends the file handle to file reader 310A. File reader 310A receives the file handle, reads the external program from the file as described above, stores the external program in editor storage 336, and sends the location of the external program within editor storage 336 to code parser 316. Code parser 316 parses the external program as described above, as if the source code of the external program had existed in the document in place of and at the location of the referring statement. There may be any number of external program files referenced by the source code in the document represented in editor storage 336 and external program files may contain referring statements to still other external program files, and all are processed as described above.

Another type of external file to which code parser 316 may encounter in a reference in the source code of the computer program in the document or an external program file is an external content file, such as an HTML file or an image file. In this case, code parser 316 sends the name and path in the reference to the external content file to JAVA/module file manager 332.

JAVA/module file manager 332 receives the name of the external file, and requests and receives a temporary folder identifier from preference manager 334. Before testing the document or program that the user has created, the user may choose a set of preferences that allow, among other things, the specification of a temporary work folder or directory. The user sets such preferences in a conventional manner by sending a command to preference manager 334 via keyboard or mouse. Preference manager 334 receives the command and saves the user's preference in local storage within preference manager 334, which may be read from a registry file upon startup of authoring/debugging tool 300 and stored thereto upon exit of the authoring/debugging tool 300. In one embodiment, the temporary work folder identifier defaults to the identifier of the operating system's temporary folder if unspecified by the user. When requested, preference manager 334 sends the identifier of the temporary folder to the requestor, which in this case is JAVA file/module manager 332.

Once JAVA/module file manager 332 has received the temporary directory identifier and the name of the external file, JAVA/module file manager 332 requests and receives a new, temporary name from temporary file namer 324, as described below, and copies the external file to the temporary directory in storage 210 of FIG. 2 naming it with the new name and maintaining any subdirectory structure relative to the directory in which the file containing the document is stored, and signals code parser 316. JAVA/module file manager 332 sends the new file name to code parser 316.

When code parser 316 receives the new file name, code parser 316 changes the external file reference in the file being parsed to the new file name.

In one embodiment, code parser 316 may encounter external program files that code parser 316 cannot parse. In such embodiment, code parser 316 treats these file as external content files, and signals JAVA/module file manager 332 to copy them to the temporary folder as described above. As code parser 316 parses the files containing source code of the program, code parser 316 associates with each statement it parses a set of information containing the file identifier of the document or external program file, the line number of the statement relative to the start of the file containing the statement, the character position of the start of the statement relative to the start of the file containing the statement, and an indicator of whether the line is the last line in the file, and the character position of the last statement in such last line. Each time code parser 316 identifies the name of a file having a name not already stored in the set, code parser 316 requests and receives as described below a new file name for such file.

As code parser 316 parses the program and processes any external files as described above, or after such time, code parser 316 causes the program to be instrumented. To instrument the program, code parser 316 selects the first statement of the program and identifies the identifier of the file containing the statement, the line number of the selected statement, and the character position of the selected statement.

Once code parser 316 has identified the line number and character position of the selected statement, code parser 316 examines the statement to see if the statement is a type that is difficult to instrument.

In the JAVASCRIPT programming language, certain control statements contain another statement. Statements that contain other statements are herein refereed to as container statements. For example, the format of the JAVASCRIPT "if" statement is if (expression) statement where "if" is a keyword, "(expression)" is a phrase that can be evaluated by a JAVASCRIPT interpreter, and "statement" is a single JAVASCRIPT statement. The "while", "do/while", "for", and "with" statements are also container statements in that they have a similar syntax that allows inclusion of a single statement.

Another feature of JAVASCRIPT is that any number of statements may be logically combined into a single statement by enclosing the number of statements in curly braces {...}. A complete description of the JAVASCRIPT language can be found in "JAVASCRIPT The Definitive Guide", by David Flanigan, O'Reilly and Associates, Sebastopol, Calif., 1998 which is hereby incorporated by reference herein in its entirety; other embodiments use other, similar references.

Code parser 316 considers container statements that contain a single statement, that is, container statements that do not make use of the curly braces syntax, to be difficult to instrument. When code parser 316 examines the selected statement, if code parser 316 detects such a statement, then code parser 316 sends the selected statement to code modifier 318.

Code modifier 318 receives the statement and changes the statement to make the statement easier to instrument. For container statements that do not make use of the curly braces syntax, code modifier 318 changes the received statement by inserting curly braces around the single statement. Code modifier 318 sends the modified statement to code parser 316. Code parser 316 sends the modified statement to code inserter 320 along with the old and new filename for use as described below.

Another type of statement that code parser 316 considers difficult to instrument is certain "return" statements. A "return" statement may return a value, and the value may be an expression. If, when code parser 316 examines the selected statement, code parser 316 detects a "return" statement that has an expression as its object, code parser 316 sends the selected statement to code modifier 318.

Code modifier 318 receives the selected statement and changes the selected statement to make the selected statement easier to instrument. For a "return" statement that has an expression as its object, code modifier 318 generates two statements: the first defines a temporary variable and sets the value of the temporary variable to the expression, and the second is a "return" statement with the temporary variable as its object.

For example, when code modifier 318 encounters the statement return foo (x);

code modifier 318 generates the statements var MM_temp=foo (x);

return MM_temp;

Code modifier 318 sends the generated statements to code parser 316.

If code parser 316 has determined that the selected statement is difficult to instrument, code parser 316 sends the selected statement to code modifier 318 as described above and receives a modified statement or statements from code modifier 318. Code parser 316 selects the first received statement, and sends the selected statement to code inserter 320 along with the old and new file identifiers, the line number of the statement, and the character position of the beginning of the statement.

If code parser 316 has determined that the selected statement is not difficult to instrument, code parser 316 sends the selected statement to code inserter 320 along with the old and new file identifiers, the line number of the statement as it occurred in the uninstrumented source code, and the character position of the statement as it occurred in the uninstrumented source code.

Code inserter 320 receives the selected statement as may have been modified into one or two statements as described above, the old and new file identifiers, the statement line number, and the statement character position, and inserts debugging instrumentation before each such statement it receives. To insert debugging instrumentation, code inserter 320 first requests program executor preferences from preference manager 334 if such preferences have not yet been requested and received.

Referring momentarily also to FIG. 2, one of the preferences that the user can set is the nomination of a preferred release and make of program executor 212A or 212B. The user uses preference manager 334 to set such preferences as described above. Preference manager 334 saves the user's program executor preference as described above. When requested, preference manager 334 sends the program executor preferences, for example Netscape 4.7, or Internet Explorer 5.5.

Code inserter 320 receives the program executor preference and tailors the instrumentation to the program executor preferences, so that code inserter 320 may insert different instrumentation for a Netscape 4.7 program executor than for an Internet Explorer 5.5 program executor.

Code inserter 320 creates a new program line by prepending instrumentation, described below, to the selected statement or statements as modified. In one embodiment, code inserter 320 inserts a semicolon (;) between the instrumentation and the selected statement. If a statement is modified into two statements, both are added to the new line and instrumentation is added before the first statement in one embodiment and before each of the two statements in another embodiment.

Once code inserter 320 has created a new program line from the instrumentation and the selected statement, code inserter 320 sends the new program line to code parser 316.

In one embodiment, using the JAVASCRIPT language, an example of the instrumentation for line 10, character position 262 of a program named JSTest is MM_bD=true;
    while(MM_bD&&!MM_bInEval)
    {try {
      MM_bD=MM_Debug(eval(MM_D),'JSTest.htm',10,
        262)
    }
    catch(e)
    {
      MM_D='\"'+MM_debugError+'\"'
    };
    }

In one embodiment, before providing the selected statement to code inserter 320, code parser 316 checks to see whether the selected statement is the last statement in its file. If the line containing the statement is the last line of the file, and the statement is at the character position of the last statement of such last line, code inserter 320 appends a duplicate copy of instrumentation to the end of the new line.

When code parser 316 processes the last line in the document or the last line in an external program file, code parser 316 sends a "last statement" signal to code inserter 320 along with the last program statement, and sends the new program line to code parser 316 as described above.

Code parser 316 receives the new program line, identifies the new file name corresponding to the new program line, and sends the complete new name of the file and the new program line to file builder 322A. File builder 322A adds the new line to the indicated file. If code parser 316 is unable to locate the new file name and path for the file, then this is the first line of a new instrumented file, so code parser 316 requests a complete file name from temporary file namer 324, and signals code inserter 320.

Temporary file namer 324 generates a unique temporary file name for the file. In one embodiment, temporary file namer 324 uses a conventional pseudo-random number generator to generate part of the file name. In one embodiment, temporary file namer 324 requests and receives a timestamp consisting of the current system date and time from the operating system, and uses this timestamp as part of the file name.

Temporary file namer 324 requests and receives the identifier of the temporary folder from preference manager 334, and combines it with the generated part of the file name to create the complete file name, including name and path.

Once temporary file namer 324 has generated a complete file name, temporary file namer 324 signals operating system to check for the existence of a file with the complete name. If operating system indicates that a file with the generated name exists, temporary file namer 324 generates a new complete name, signals operating system as described above, and continues in this manner until temporary file namer 324 has generated a complete name that does not correspond to an existing file.

In another embodiment, instead of generating the complete filename itself, temporary file namer 324 signals operating system to generate a complete file name. In still another embodiment, temporary file namer 324 prompts the user to enter a temporary name, receives the temporary name from the user, signals operating system to check the received name as described above, and re-prompts the user if the received name is unsuitable.

Once temporary file namer 324 has generated a unique complete file name, temporary file namer 324 sends the complete file name to code parser 316.

Code inserter 320 generates a set of utility functions to be inserted at the beginning of the instrumented program. The utility functions are a set of common routines that perform initialization, environment checking, and other housekeeping functions. In one embodiment, code inserter 320 generates utility functions based on the program executor preferences. Once code inserted 320 has generated the utility function, code inserter 320 sends the utility functions to code parser 316.

Code parser 316 receives the complete file name and the utility functions, creates an entry consisting of the complete file name and the file identifier of the uninstrumented file, and stores this entry in local storage, within code parser 316. If code parser 316 has not found a complete file name in local storage and so has signaled temporary file namer 324 as described above, code parser 316 sends the complete file name, the utility functions, and the new program line to file builder 322A if code parser 316 has found the complete file name in local storage, code parser 316 sends the complete file name and the new program line to file builder 322A.

Referring now also to FIG. 2, file builder 322A receives the complete file name, the utility functions if provided, and the new program line. If the utility functions were provided, file builder 322A writes the utility functions to storage 210, naming the file with the complete file name. If the utility functions were not provided, file builder 322A writes the new program line to the file with the complete file name in storage 210.

Referring also now to FIG. 4B, a schematic diagram of an instrumented program according is shown according to one embodiment of the present invention. Code parser 316 selects the next statement of the program, or the next received statement from code modifier 318 if not all statements received from code modifier 318 have yet been selected, and proceeds as described above until code parser 316 has caused each program statement to be instrumented and written to storage 210 with a complete file name. The instrumented program in storage 210 is herein referred to as program 400B. Once code parser 316 has instrumented the program and caused the instrumented program to be written to storage 210, code parser 316 sends the new file name and path of the document file to command manager 330.

A Description of the Program

Figure 4C:
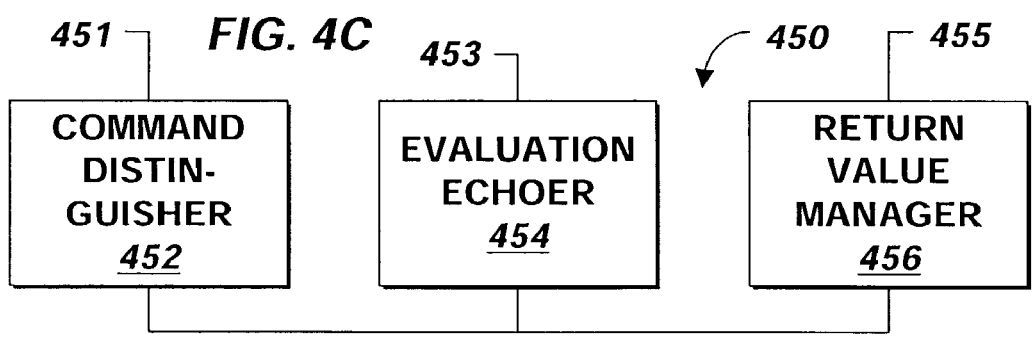
FIG. 4C is a block schematic diagram of an interface module according to one embodiment of the present invention.
Figure 4D:
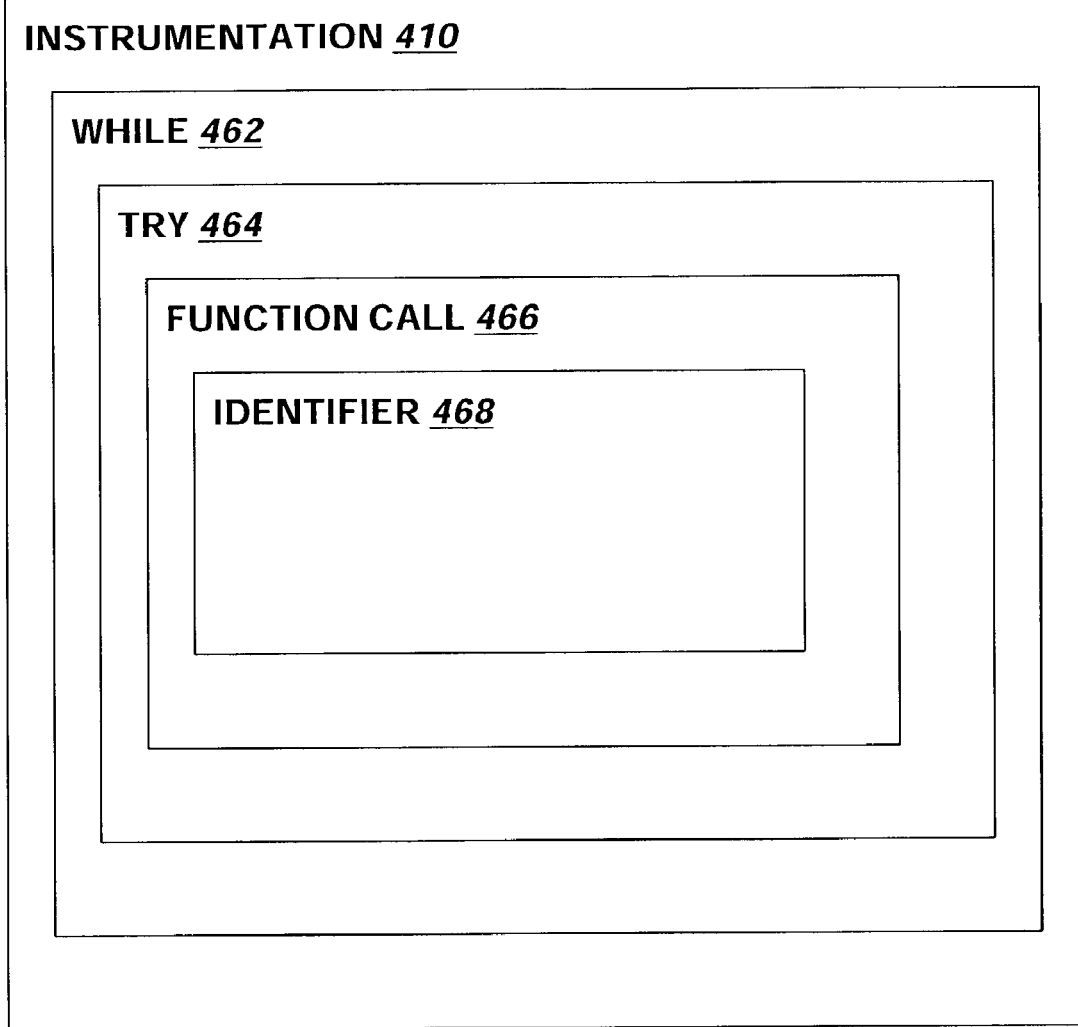
FIG. 4D is a block schematic diagram of instrumentation 410 of FIG. 4B according to one embodiment of the present invention.

Referring now to FIG. 4A, FIG. 4B, and FIG. 4D, a block schematic diagram of instrumentation 410 of FIG. 4B is shown according to one embodiment of the present invention. Program file 400B is arranged using a format, which will now be described. Although the file format described herein is a representative file format, the present invention may be applied to any number of file formats to be used as programs.

Each instrumented program file 400B is sourced from an uninstrumented program such as program file 400A. The first block of code in program file 400B are utility functions 408, which contain routines that perform initialization, environment checking, and other housekeeping functions. An example of these utility functions is contained in Appendix A. (In one embodiment, utility functions 408 are inserted into the instrumented document file upon the user's commencement of debugger 326. In one embodiment, utility functions 408 are only added to the instrumented document file, but not to external files.)

Utility functions 408 is followed by instrumentation 410, which consists of while 462, try 464, function call 466, and identifier 468. While 462 initializes the value of a flag to true, then checks the value of the flag and continues to execute try 464, function call 466, and identifier 468 as long as the value of the flag is true.

Try 464 executes function call 466, and sets the value of the flag to the value returned by function call 466. If function call 466 returns an error, try 466 sets a feedback variable to issue an error on the next iteration.

Function call 466 executes the MM_Debug function (which can be found in Appendix B) with a parameter of identifier 468. Identifier 468 consists of the file identifier of the uninstrumented file, the line number of the current statement within the uninstrumented file with respect to the beginning of the file, and the character position of the current statement within the uninstrumented file with respect to the beginning of the file.

Instrumentation 410 is followed by user code 430, which is derived from the first statement of the user's program, as described above. As an example, user code 430 of FIG. 4B is identical to user code 430 of FIG. 4A.

Instrumentation 410 and user code 430 are concatenated together with semicolons so that, although the interpreter treats instrumentation 410 and user code 430 as two separate statements, the concatenation takes but a single line of instrumented program file 400B.

Instrumentation 412 is similar to instrumentation 410, except for the value of its identifier. User code 432 is derived from user code 431 of FIG. 4A, as described above. As an example, user code 431 of FIG. 4A has been split by the operation of system 200 into user code 432 and user code 434, which are instrumented by instrumentation 412 and instrumentation 414, respectively.

The file format continues in this manner, with groups of two statements: instrumentation and user code. There can be any number of such groups, although the Figure shows only instrumentation 410-414 and user code 430-434.

JAVA/module file manager 332 locates several components of system 200 and copies them to a location accessible to the program. To do this, JAVA/module file manager 332 requests and receives the temporary directory identifier from preference manager 334. JAVA/module file manager 332 locates JAVA program 500 and interface module 450 by means of file identifiers stored within JAVA/module file manager 332, and copies JAVA program 500 and interface module 450 into the temporary directory in storage 210.

Figure 5A:
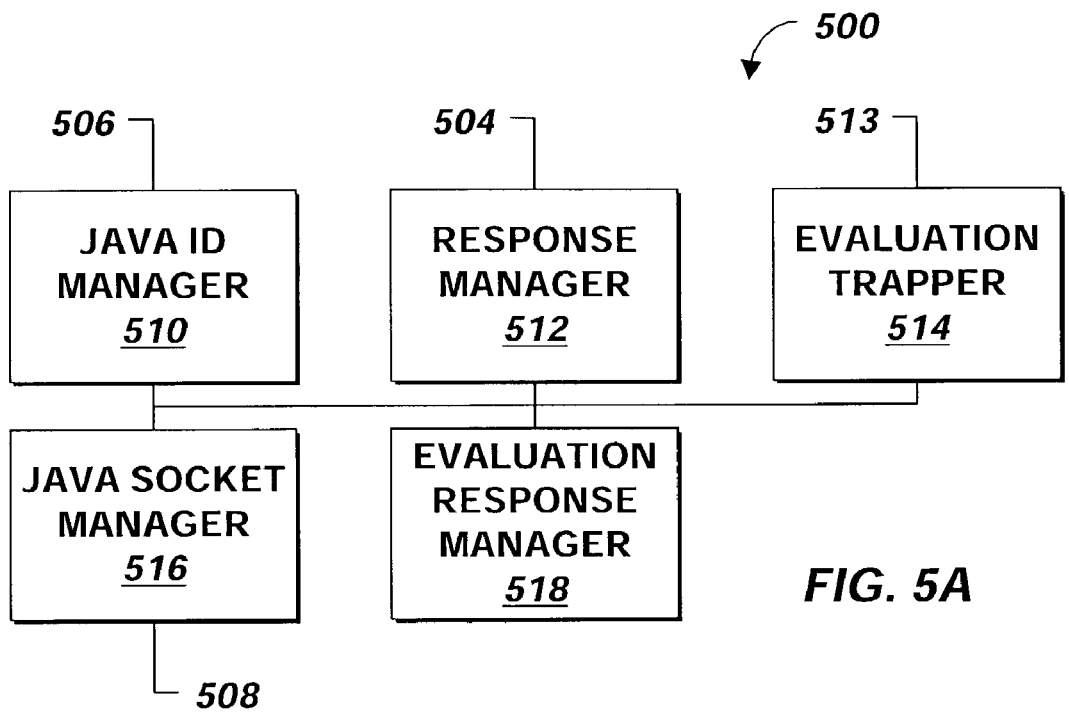
FIG. 5A is a block schematic diagram of a JAVA program according to one embodiment of the present invention.

FIG. 4C illustrates a block schematic diagram of an interface module according to one embodiment of the present invention. FIG. 5A illustrates a block schematic diagram of a JAVA program according to one embodiment of the present invention. Referring now to FIGS. 2, 3, 4B, 4C and 5A, command manager 330 launches a program executor 212A-212B to execute program 400B by requesting and receiving the complete new file name of the document file, requesting and receiving program executor preferences from preference manager 334 as described above, reformatting the complete file name as a URL, and sending the URL to the preferred program executor 212A-212B. In one embodiment, operating system launches program executor 212A if program executor 212A is not already active.

Figure 5B:
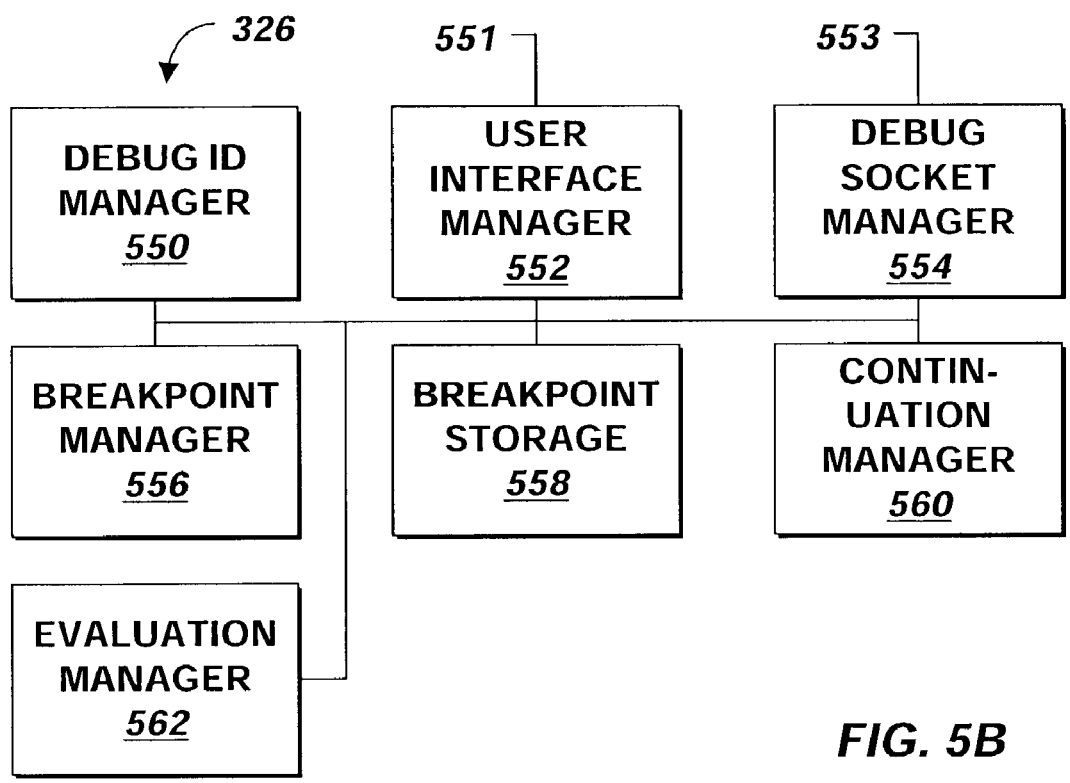
FIG. 5B is a block schematic diagram of debugger 326 of FIG. 3 illustrating a debugger according to one embodiment of the present invention.

FIG. 5B illustrates a block schematic diagram of debugger 326 of FIG. 3 according to one embodiment of the present invention. Referring also to FIG. 5B, command manager 330 also signals debugger 326, which signals debug socket manager 554 to set up a TCP/IP socket listening on a specific port by means of a call to operating system.

Referring also to FIG. 4B, program executor 212A receives the URL and runs program 400B. In order to do this, program executor 212A uses the URL to find the location of program 400B in storage 210 and reads program 400B into local storage within program executor 212A.

Program 400B contains initialization functions as part of utility functions 408, as described above. As program executor 212A loads program 400B, program executor 212A executes the initialization functions, which launch JAVA program 500 and interface module 450. In one embodiment, interface module 450 is embedded in program 400B; in one embodiment interface module 450 is referenced by program 400B and is launched by the initialization functions in program 400B. An example of interface module 450 is shown in Appendix B1, and extensions to interface module 450 for the INTERNET EXPLORER embodiment of program executor 212A-212B is in Appendix B2. Once JAVA program 500 is launched, JAVA program 500 signals JAVA socket manager 516 to initialize a socket on the same port as debug socket manager 554.

In one embodiment, during JAVA program 500 launch, program executor 212A checks the authorization of JAVA program 500 and prompts the user to verify a certificate or otherwise give permission to JAVA program 500. In such embodiment, part of the utility functions 408 in program 400B alerts the user to the verification or permission requirement before program executor 212A prompts the user.

An example of JAVA program 500 for the Internet Explorer embodiment of program executor 212A-212B is in Appendix C1; An example of JAVA program 500 for the Netscape embodiment of program executor 212A-212B is in Appendix C2.

Program executor 212A selects the first statement of program 400B, which is instrumentation 410, and executes instrumentation 410.

Instrumentation 410 executes the statements corresponding to while 462, try 464, and function call 466 as described above. The statement corresponding to function call 466 contains identifier 468 which contains the file identifier, the statement number, and the statement character position as described above. The file identifier, statement number, and statement character position are collectively referred to herein as the ID object. The function executing in program executor 212A-212B sends the ID object to JAVA ID manager 510 and returns control to program executor 212A. JAVA ID manager 510 is part of the JAVA program called by utility functions 408 and illustrated on FIG. 5A.

Program executor 212A-212B signals command distinguisher 452, which receives the signal via input 451 and waits for additional input. Program executor 212A-212B does this by executing function call 466 as described above. In one embodiment, program executor 212A-212B signals command distinguisher 452 by invoking command distinguisher 452 via a function call which does not return until command distinguisher 452 receives additional input and completes execution.

Once program executor 212A-212B running function call 466 has sent the ID object to JAVA ID manager 510, JAVA ID manager 510 receives the ID object via input 506 and sends the ID object to JAVA socket manager 516. JAVA socket manager 516 receives the ID object and sends the ID object to debug socket manager 554 via input/output 508 using the socket described above. Debug socket manager 554 receives the ID object via input/output 553 and sends the ID object to debug ID manager 550.

Debug ID manager 550 receives the ID object, extracts the file identifier from the ID object, and scans an index of files stored in debug storage 338 for the file identifier. If debug ID manager 550 does not locate the file identifier matching the file identifier it receives, debug ID manager 550 requests and receives the identifier of the work folder from preference manager 334, constructs a complete file name from the work folder identifier (described below) and the file identifier, and sends the file name to file reader 310A with an instruction to store the file in debug storage 338. File reader 310A receives the file name, reads the file referred to by the received file name into debug storage 338, inserts the location of the file in debug storage 338 into the index in debug storage 338 and signals debug id manager 550.

One of the preferences that the user can set is the identity of a folder or directory used to hold work in progress, herein called the work folder. The user uses preference manager 334 to set such preferences as described above. Preference manager 334 saves the preferred work folder identifier with the other preferences as described above. When requested, preference manager 334 sends the work folder identifier to the requestor.

Once debug ID manager 550 has ensured that the program being debugged has been read into storage, debug ID manager 550 checks breakpoint storage 558 for a breakpoint matching the ID object.

Before command manager 330 launches program executor 212A, command manager 330 signals user interface manager 552 via input/output 551. User interface manager 552 manages a conventional user interface and allows the user to communicate with debugger 326 via a keyboard, mouse, display, or other conventional user input and output devices. In one embodiment, all communication into or out of user interface manager 552 is done via input/output 551, which is coupled to communication interface 328 described above.

User interface manager 552 prompts the user to enter a list of breakpoints, and receives the user's list of breakpoints. Each breakpoint contains a filename and line number before which the user would like execution of the program to stop so that the user can evaluate the current value of certain variables and expressions.

In one embodiment, user interface manager 552 displays a requested file containing source code used with the program in debug storage 338 in a window or pane on the display, and allows the user to select a program line where the user wishes to insert a breakpoint. In such embodiment, user interface manager 552 receives the user's selected line, computes the line number of the selected line as described above, and stores the line number and the file identifier of the file being displayed in breakpoint storage 558.

In another embodiment, user interface manager 552 receives the user's selected line as well as the character position within the line where the user clicked. In such embodiment, user interface manager 552 computes the character position of the click with respect to the beginning of the file, and stored the character position and the file identifier of the file being displayed in breakpoint storage 558.

Once the user has set one or more breakpoints, the user may wish to remove one or more breakpoints. To do this, user interface manager 552 prompts the user for a breakpoint to remove, and receives the breakpoint as described above, and removes it from breakpoint storage.

In one embodiment, setting or clearing a breakpoint is performed as a toggle function in a graphical user interface as displayed above. When the user clicks the icon in a column displayed next to the lines from the file, user interface manager 552 computes the line number of the received line as described above, and scans breakpoint storage 558 for the line number of the received line. If user interface manager 552 does not find the line number of the received line in breakpoint storage 558 then user interface manager 552 stores the line number of the received line in breakpoint storage 558. If user interface manager 552 finds the line number of the received line in breakpoint storage 558 then user interface manager 552 removes the line number of the received line from breakpoint storage 558.

As described above, debug ID manager 550 checks breakpoint storage 558 for a breakpoint matching the ID object when it receives the ID object. If debug ID manager 550 determines that the ID object does not match any breakpoint in breakpoint storage 558, debug ID manager 550 signals continuation manager 560. Continuation manager 560 receives the signal and sends a "continue" command to debug socket manager 554. Debug socket manager 554 receives the "continue" command and sends the "continue" command to JAVA socket manager 516 via input/output 553.

JAVA socket manager 516 receives the "continue" command via input/output 508, and sends the "continue" command to response manager 512. Response manager 512 receives the "continue" command and sends the "continue" command to command distinguisher 452 via output 504.

Command distinguisher 452 completes its wait by receiving the "continue" command on input 451, and sends the "continue" command to return value manager 456.

Return value manager 456 receives the "continue" command and signals function call 466 via output 455. In one embodiment, return value manager 466 is part of a function that has been called by function call 466, and return value manager 456 returns a value of "false" to allow function call 466 to continue. Function call 466 receives the value and returns the value to try 464, which returns the value to while 462, which examines the "false" value and exits from the loop by signaling program executor 212A. Program executor 212A receives the signal, selects the next statement of program 400B which is user code 430, and executes user code 430. Program executor 212A selects the next statement of program 400B which is instrumentation 412, executes instrumentation 412, and continues as described above until program executor 212A has executed all statements of program 400B.

Program Encounters a Breakpoint

As described above, debug ID manager 550 scans breakpoint storage 558 looking for a breakpoint that matches the ID object as described above. If debug ID manager 550 finds a breakpoint that matches the ID object, debug ID manager 550 sends the ID object to breakpoint manager 556.

Breakpoint manager 556 receives the ID object and sends the ID object to user interface manager 552. User interface manager 552 receives the ID object, extracts the file identifier and statement line number from the ID object, locates the program in debug storage 338 corresponding to the file identifier as described above using the index of files, and displays the program with the indicated statement highlighted. If the file identifier is not in the index of files, breakpoint manager 556 sends the name of the file to file reader 310A with an instruction to store the file in debug storage 338. File reader 310A reads the file into debug storage 338, stores the filename in the index of files and signals user interface manager 552.

User interface manager 552 prompts the user to provide a command. In one embodiment, the user can provide a "continue", "set/remove breakpoint", "stop debugging", or "evaluate" command.

User interface manager 552 receives the command provided by the user, and examines the command. If the command is "continue", user interface manager 552 signals continuation manager 560 and the process continues as described above. If the command is "set/remove breakpoint", user interface manager 552 adds or removes the indicated breakpoint from breakpoint storage 558 as described above. If the command is "stop debugging", user interface manager 552 signals interface module 450, JAVA program 500, and command manager 330 terminates the operation of debugger 326. Interface module 450 signals program 400B to run to completion as described above, interface module 450 exits, and JAVA program 500 exits.

The User Evaluates an Expression

If the command is "evaluate", the user provides an expression that the user wishes to evaluate, and user interface manager 552 receives the expression. User interface manager 552 sends the expression to debug socket manager 554. Debug socket manager 554 receives the expression and sends the expression to JAVA socket manager 516 via input/output 553. JAVA socket manager 516 receives the expression via input/output 508 and sends the expression to response manager 512.

Response manager 512 receives the expression and sends the expression to command distinguisher 452 via output 504. Command distinguisher 452 completes its wait by receiving the expression on input 451, and sends the expression to evaluation echoer 454.

Evaluation echoer 454 receives the expression, sends the expression to evaluation trapper 514 on output 453, and sends a value of "true" to return value manager 456. Evaluation trapper 514 receives the expression on input 513, sends the expression to the JAVASCRIPT or other interpreter, and receives the evaluated expression (or an error indication) from the JAVASCRIPT or other interpreter.

Evaluation trapper 514 sends the evaluated expression to evaluation response manager 518. Evaluation response manager 518 receives the evaluated expression and reformats the evaluated expression into a character string.

Evaluation response manager 518 sends the character string to JAVA socket manager 516, which receives the character string and sends the character string to debug socket manager 554 via input/output 508. Debug socket manager 554 receives the character string via input/output 553 and sends the character string to evaluation manager 562. Evaluation manager 562 receives the character string and sends the character string to user interface manager 552. User interface manager 552 receives and displays the character string, and prompts the user to provide a command as described above.

Return value manager 456 receives the "true" from evaluation echoer 454, and returns "true" to function call 466. Function call 466 returns "true" to try 464, which returns "true" to while 462, which evaluates "true" and executes the loop once again, which executes try 464 as described above.

In one embodiment, evaluation trapper 514 is contained within evaluation echoer 454. In such embodiment, if evaluation trapper 514 sends the expression to the JAVASCRIPT or other interpreter and receives an error indication, evaluation trapper 514 sends the error indication to user interface manager 552 via evaluation response manager 518, JAVA socket manager 516, and debug socket manager 554 as described above, and also signals function call 466 with the error. Function call 466 reflects the error to try 464, which catches the error, formats an error message, and sends the error message to while 462. While 462 receives the error message, evaluates the flag, and executes try 464 and thus function call 466 again, adding the error message to identifier 468.

The Evaluation List

In one embodiment, debugger 326 maintains a list of expressions, managed by the user, that are evaluated at every breakpoint. To do this, user interface manager 522 prompts the user to provide a command when stopped at a breakpoint as described above, but instead of an "evaluate" command, user interface manager 522 accepts "add to evaluation list" and "remove from evaluation list".

User interface manager 552 receives the command provided by the user, and examines the command as described above. If the command is "add to evaluation list", user interface manager 552 requests and receives from the user an expression that the user wishes to add an expression to the evaluation list. An expression can be a variable used in the program or an expression that includes one or more variables used in the program, such as X+Y. User interface manager 552 stores the received expression in breakpoint storage 558.

If the command is "remove from evaluation list", the user has first selected an expression to remove from a list of expressions in the evaluation list displayed by user interface manager 552. User interface manager 552 receives the selected expression, scans breakpoint storage 558 to locate the selected expression, and removes the selected expression from breakpoint storage 558.

Each time the ID object corresponds to a breakpoint, user interface manager 552 sends the expressions in the evaluation list to be evaluated one at a time as if the user had requested them manually as described above. User interface manager 552 selects the first expression in breakpoint storage 558 and sends the selected expression to evaluation trapper 514 via debug socket manager 554, JAVA socket manager 516, response manager 512, command distinguisher 452, and evaluation echoer 454 as described above. Evaluation trapper 514 evaluates the expression as described above, and sends the evaluated expression to evaluation response manager 518, which reformats the evaluated expression into a character string as described above. Evaluation response manager 518 sends the character string to user interface manager 552 via JAVA socket manager 516, debug socket manager 554, and evaluation manager 462 as described above, and returns a value of "false" to function call 466 as described above.

User interface manager 552 receives the character string, and displays the original expression and the character string. User interface manager 552 selects the next expression in breakpoint storage 558 and proceeds as described above until user interface manager 552 has caused all expressions in breakpoint storage 558 to be evaluated and has displayed the resulting character strings.

Referring now to FIG. 6A, a method of debugging a file in shown according to one embodiment of the present invention. A command is received to open a file or create a file and the file is opened or created and stored as objects 610 as described above, the file containing at least a part of source code for a program and optionally other information as described above. Modifications are received such as by using either of two editors described above, and the stored objects are updated and one or more representations of the objects, either as text, graphics or both are updated 612 as described above. A command to store the objects into a file may be received and the file is stored 614 as described above. A request to debug a program contained at least in part in the file is received 616 as described above. The program is instrumented 618 as described above and as described below with respect to FIG. 7. The user is prompted for breakpoints, an evaluation list or both of these 620 as described above. The breakpoints and/or evaluation list is received and stored 622 as described above.

The instrumented program is launched 624 in a browser or other means of executing the program such as an interpreter or by first compiling and then executing the program as described above. A communications program is started 626 to communicate between the browser or other means, which may result from step 624 as described above. An interface module is also started 628 which may also result from step 624. An ID object is received 630 as described above and the filename and line number and optionally the offset is compared 632 with the list of breakpoints as described above. If the ID object matches the list of breakpoints 634, the method continues at stop 660 of FIG. 6C and otherwise 634, the method continues at step 638 unless the breakpoint corresponds to the end of the program 636 at which point the method terminates 600. In one embodiment, step 618 involves identifying the end of the program and storing a breakpoint corresponding thereto. At step 636 a continuation signal is sent and the method continues at step 630.

Figure 6C:
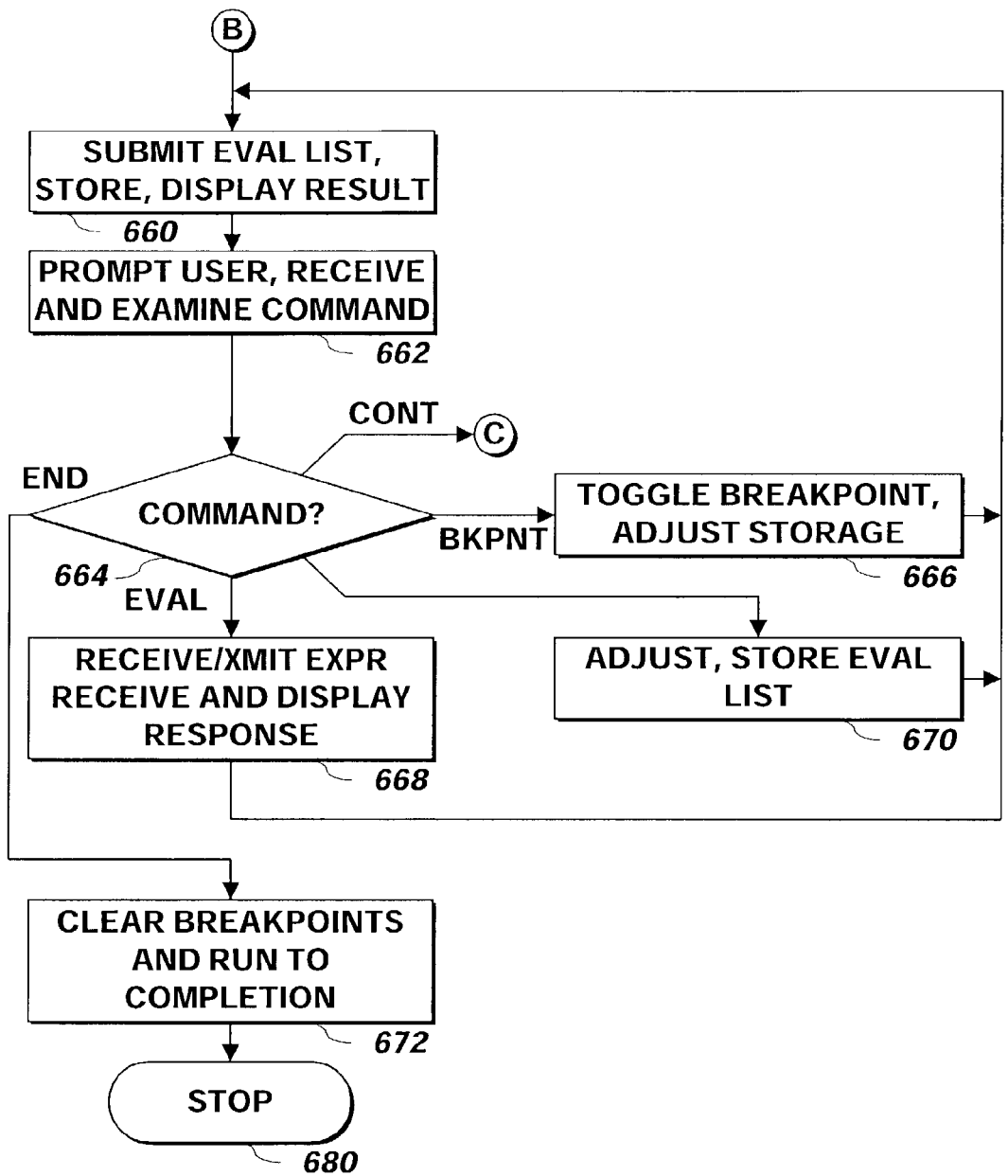

At step 660 shown in FIG. 6C, the expressions on the evaluation list are submitted one at a time and the results received, stored and displayed as described above. The user is prompted for a command and the command to toggle the breakpoint 664, the breakpoint is toggled 666 as described above and the method continues at step 660 in one embodiment, and 662 in another embodiment indicated by the dashed line in the Figure. If the command is a command to evaluate an expression 664, the expression is received and transmitted and the response to the request is received and displayed 668 as described above and the method continues at step 660 in one embodiment, or step 662 in another embodiment. If the command is a command to maintain the evaluation list 664 by adding or removing an entry, the update is received and the evaluation list is updated and/or stored 670 and the method continues at step 660. If the command is a command to end debugging operations 664, the breakpoints are cleared and the program is run to completion 672 and the method terminates as described above.

Referring now to FIG. 6B, a method of executing a program instrumented for debugging is shown according to one embodiment of the present invention. The first code statement in the program is selected 640 and the selected code statement is executed 642. The ID object and any result of an evaluation is provided 644, for example to a debugger, as described above. The method waits for, and receives a command 646. If the command received in step 648 is a command to continue operation of the program 648 the next code statement is selected 652 and the method continues at step 642 using the newly selected statement. In one embodiment, step 652 includes checking to see if there are more statements in the program before selecting the next one. If the command is a command to evaluate an expression 648, the expression is received, and caused to be evaluated 650 as described above and the method continues at step 644.

Figure 7:
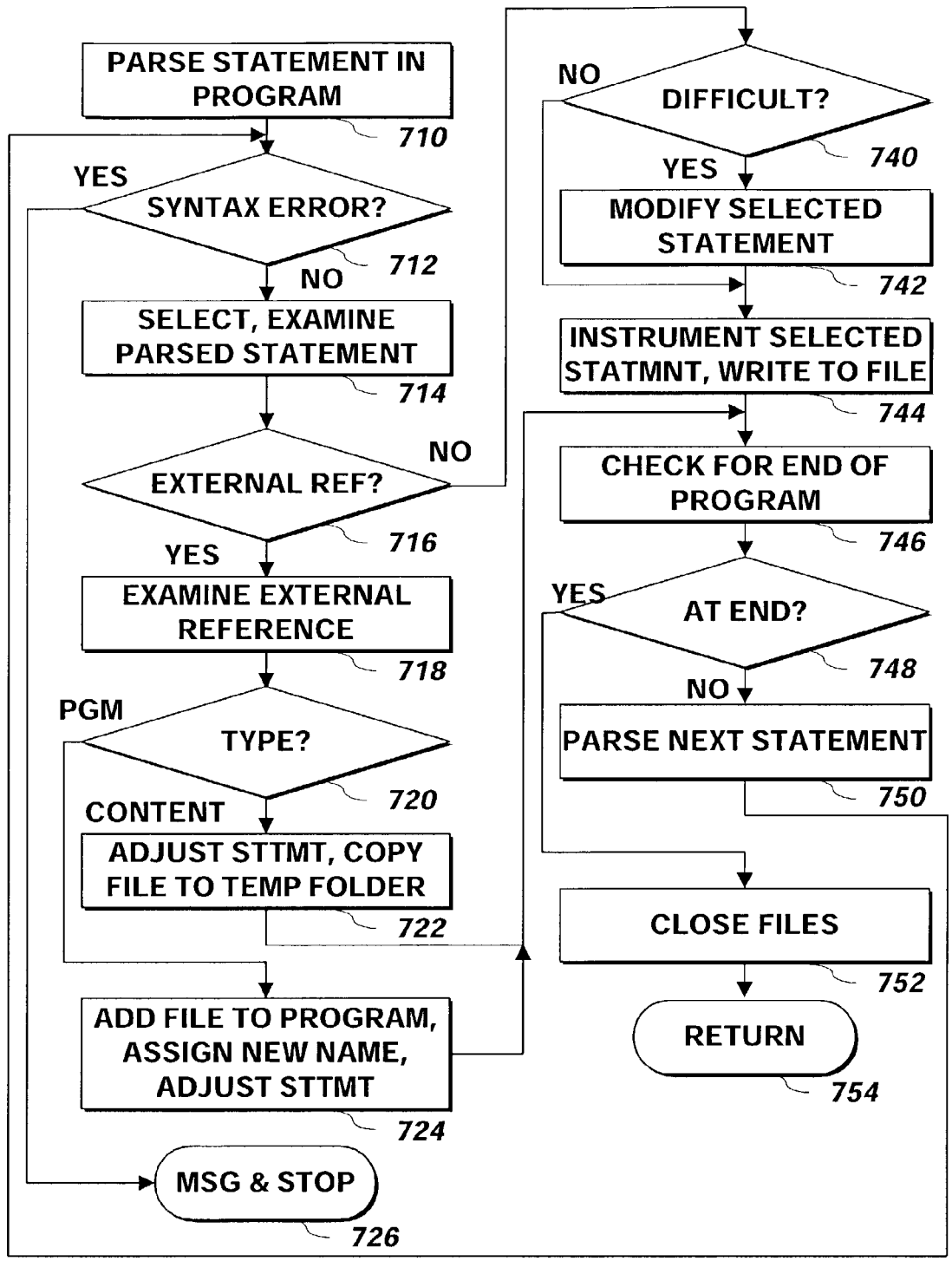
FIG. 7 is a method of instrumenting a program according to one embodiment of the present invention.

Referring now to FIG. 7, a method of instrumenting a program is shown according to one embodiment of the present invention. A Statement in a program is parsed 710 as described above. If a syntax error is detected as described above 712, an error message is provided and the method terminates 726. Otherwise 712, the parsed statement is selected and examined as described above 714. If the statement references an external file 716, the external reference is examined 718 and if the type of the reference is a program 720, the external file is assigned a new filename and path, the reference is adjusted in the statement to the new filename and path and the file is added to the program for parsing as described above 722 and the method continues at step 746 as described above.

If the reference is a content file 720, the file is optionally copied and the reference to it is adjusted as described above 722 and the method continues at step 746. In one embodiment, step If the statement is not an external reference 716, the method continues at step 740. The statement is evaluated to determine whether the statement is difficult to instrument and if so 740, the statement is modified 742 as described above and the method continues at step 744. Otherwise 740, the method continues at step 744. At step 744, the statement or statement as modified or statements derived from the statement parsed are written to the proper file as described above and the method continues at step 746. In one embodiment, utility functions are written to the instrumented file corresponding to the document file before the first new line is written to the file as described above.

At step 746, the program is investigated to identify if the statement parsed was the last line in the program, and if so 748, the files written are closed 752 and otherwise 748 the next statement in the program is parsed 750 and the method continues at step 712 as described above.

What is claimed is:

1. A method of debugging a program in a runtime environment, the method comprising:
   receiving the program;
   modifying the program to communicate with a debugging tool by supplying additional code to the program, wherein modifying the program comprises adding at least one statement before each of multiple statements in the program and defining at least one function as part of the modified program, the at least one function comprises code to avoid a crash;
   executing at least a portion of the modified program in the runtime environment separate from the debugging tool;
   operating the debugging tool simultaneously with executing the modified program; and
   communicating between the debugging tool and the modified program during the operating of the debugging tool.

2. The method of claim 1 wherein the debugging tool is supplied by a supplier different from a supplier of the runtime environment.

3. The method of claim 1 wherein the runtime environment comprises a browser.

4. The method of claim 1 wherein the program comprises JAVA code.

5. The method of claim 1 wherein the code to avoid the crash comprises a "try" statement.

6. The method of claim 1 wherein the receiving the program comprises incorporating at least one external program file into the program.

7. The method of claim 1 wherein the modifying the program comprises changing each identifier of at least one external content file in the program to a different identifier.

8. The method of claim 1 wherein the modifying comprises adding code to identify to the debugging tool at least one location in a source code of the program.

9. The method of claim 8 wherein the location comprises a line number of the source code of the program.

10. The method of claim 1:
    additionally comprising receiving at least one break point; and
    wherein the executing the at least a portion of the modified program comprises at least suspending operation of the modified program responsive to the breakpoint.

11. The method of claim 10 wherein the suspending operation comprises receiving at least one additional breakpoint.

12. The method of claim 10 wherein the suspending operation comprises removing at least one breakpoint.

13. The method of claim 10 wherein the suspending operation comprises:
    receiving at least one statement to be evaluated;
    providing the at least one statement to be evaluated;
    receiving a response to the at least one statement provided; and
    displaying the response received.

14. The method of claim 13 wherein the at least one statement to be evaluated during suspension of operation of the modified program is received via user input performed after said suspension of operation of the modified program.

15. The method of claim 13 wherein the at least one statement to be evaluated during suspension of operation of the modified program is received before said suspension of operation of the modified program.

16. The method of claim 10 wherein the suspending operation comprises:
    displaying at least a portion of source code for the program; and
    highlighting at least one line in the source code corresponding to the suspending operation.

17. A system for debugging a program in a runtime environment, the system comprising:
    a user interface device; and
    one or more computers operable to interact with the user interface device and to perform operations comprising:
    receiving the program;
    modifying the program to communicate with a debugging tool by supplying additional code to the program, wherein modifying the program comprises adding at least one statement before each of multiple statements in the program and defining at least one function as part of the modified program, the at least one function comprises code to avoid a crash;
    executing at least a portion of the modified program in the runtime environment separate from the debugging tool;
    operating the debugging tool simultaneously with executing the modified program; and
    communicating between the debugging tool and the modified program during the operating of the debugging tool.

18. The system of claim 17 wherein the debugging tool is supplied by a supplier different from a supplier of the program executor.

19. The system of claim 17 wherein the runtime environment comprises a browser.

20. The system of claim 17 wherein the program comprises JAVA code.

21. The system of claim 17 wherein the code to avoid the crash comprises a "try" statement.

22. The system of claim 17 wherein the receiving the program comprises incorporating at least one external program file into program.

23. The system of claim 17 wherein the modifying the program comprises changing each identifier of at least one external content file in the program to a different identifier.

24. The system of claim 17 wherein the modifying comprises adding code to identify to the debugging tool at least one location in a source code of the program.

25. The system of claim 24 wherein the location comprises a line number of the source code of the program.

26. The system of claim 17 wherein the one or more computers operable to perform additional operations comprising:
   receiving at least one break point; and
   wherein the executing the at least a portion of the modified program comprises at least suspending operation of the modified program responsive to the breakpoint.

27. The system of claim 26 wherein the suspending operation comprises receiving at least one additional breakpoint.

28. The system of claim 26 wherein the suspending operation comprises removing at least one breakpoint.

29. The system of claim 26, wherein the suspending operation comprises:
   receiving at least one statement to be evaluated;
   providing the at least one statement to be evaluated;
   receiving a response to the at least one statement provided; and
   displaying the response received.

30. The system of claim 29 wherein the at least one statement to be evaluated during suspension of operation of the modified program is received via user input performed after said suspension of operation of the modified program.

31. The system of claim 29 wherein the at least one statement to be evaluated during suspension of operation of the modified program is received before said suspension of operation of the modified program.

32. The system of claim 26 wherein the suspending operation comprises:
   displaying at least a portion of source code for the program; and
   highlighting at least one line in the source code corresponding to the suspending operation.

33. A computer program product comprising a computer useable medium having computer readable program code embodied therein for debugging a program in a runtime environment, the computer program product comprising computer readable program code devices configured to cause a computer to:
   receive the program;
   modify the program to communicate with a debugging tool by supplying additional code to the program wherein modifying the program comprises adding at least one statement before each of multiple statements in the program and defining at least one function as part of the modified program, the at least one function comprises code to avoid a crash;
   execute at least a portion of the modified program in the runtime environment separate from the debugging tool;
   operate the debugging tool simultaneously with executing the modified program; and
   communicating between the debugging tool and the modified program during the operating of the debugging tool.

34. The computer program product of claim 33 wherein the debugging tool is supplied by a supplier different from a supplier of the runtime environment.

35. The computer program product of claim 33 wherein the runtime environment comprises a browser.

36. The computer program product of claim 33 wherein the program comprises JAVA code.

37. The computer program product of claim 33 wherein the code to avoid the crash comprises a "try" statement.

38. The computer program product of claim 33 wherein the computer readable program code devices configured to cause a computer to receive the program comprise computer readable program code devices configured to cause a computer to incorporate at least one external program file into the program.

39. The computer program product of claim 33 wherein the computer readable program code devices configured to cause a computer to modify the program comprise computer readable program code devices configured to cause a computer to change each identifier of at least one external content file in the program to a different identifier.

40. The computer program product of claim 33 wherein the computer readable program code devices configured to cause a computer to modify the program comprise computer readable program code devices configured to cause a computer to add code to identify to the debugging tool at least one location in a source code of the program.

41. The computer program product of claim 40 wherein the location comprises a line number of the source code of the program.

42. The computer program product of claim 33:
   additionally comprising computer readable program code devices configured to cause a computer to receive at least one break point; and
   wherein the computer readable program code devices configured to cause a computer to execute the at least a portion of the modified program comprise computer readable program code devices configured to cause a computer to at least suspend operation of the modified program responsive to the breakpoint.

43. The computer program product of claim 42 wherein the computer readable program code devices configured to cause a computer to suspend operation comprise computer readable program code devices configured to cause a computer to receive at least one additional breakpoint.

44. The computer program product of claim 42 wherein the computer readable program code devices configured to cause a computer to suspend operation comprise removing at least one breakpoint.

45. The computer program product of claim 42 wherein the computer readable program code devices configured to cause a computer to suspend operation comprise computer readable program code devices configured to cause a computer to:
   receive at least one statement to be evaluated;
   provide the at least one statement to be evaluated;
   receive a response to the at least one statement provided, and
   display the response received.

46. The computer program product of claim 45 wherein the at least one statement to be evaluated during suspension of operation of the modified program is received via user input performed after said suspension of operation of the modified program.

47. The computer program product of claim 45 wherein the at least one statement to be evaluated during suspension of operation of the modified program is received before said suspension of operation of the modified program.

48. The computer program product of claim 42 wherein the computer readable program code devices configured to cause a computer to suspend operation comprise computer readable program code devices configured to cause a computer to:
   display at least a portion of source code for the program; and
   highlight at least one line in the source code corresponding to suspending operation.

* * * * *

UNITED STATES PATENT AND TRADEMARK OFFICE
CERTIFICATE OF CORRECTION

| | | |
|---|---|---|
| PATENT NO. | : 7,426,717 B1 | Page 1 of 1 |
| APPLICATION NO. | : 10/293687 | |
| DATED | : September 16, 2008 | |
| INVENTOR(S) | : Jeff Schang and David W. George | |

It is certified that error appears in the above-identified patent and that said Letters Patent is hereby corrected as shown below:

Claim 33:
    column 21, line 40:
        delete "program wherein", and replace with --program, wherein-- column 21, line 50:
        delete "communicating between", and
        replace with --communicate between--

Claim 45:
    column 22, line 44:
        delete "provided," and replace with --provided;--

Signed and Sealed this

Twelfth Day of May, 2009

JOHN DOLL
*Acting Director of the United States Patent and Trademark Office*